United States Patent [19]
Clonan

[11] Patent Number: 6,116,673
[45] Date of Patent: Sep. 12, 2000

[54] MOUNTING FIXTURE FOR TRUCK BED

[75] Inventor: Richard S. Clonan, Cazenovia, N.Y.

[73] Assignee: Slide Systems, LLC, Syracuse, N.Y.

[21] Appl. No.: 09/244,810

[22] Filed: Feb. 5, 1999

[51] Int. Cl.$^7$ .................................................. B60R 9/00
[52] U.S. Cl. .............................. 296/37.6; 296/3; 296/43; 296/100.17; 248/229.25
[58] Field of Search ................. 296/37.6, 3, 43, 296/100.16, 100.17, 100.18, 100.01; 248/229.25, 227.2, 228.6, 231.71

[56] References Cited

U.S. PATENT DOCUMENTS

| | | | |
|---|---|---|---|
| 4,522,326 | 6/1985 | Tuohy, III | 224/310 |
| 4,693,508 | 9/1987 | Pettit | 296/100.03 |
| 5,052,739 | 10/1991 | Irwin | 296/37.6 |
| 5,088,636 | 2/1992 | Barajas | 224/281 |
| 5,121,959 | 6/1992 | King | 296/37.6 |
| 5,137,320 | 8/1992 | Christensen | 296/3 |
| 5,165,750 | 11/1992 | Pirhonen | 296/43 X |
| 5,257,850 | 11/1993 | Brim | 296/39.2 |
| 5,310,238 | 5/1994 | Wheatley | 296/3 X |
| 5,316,190 | 5/1994 | Bullock | 296/3 X |
| 5,353,826 | 10/1994 | Davis, Sr. | 248/231.77 X |
| 5,385,377 | 1/1995 | Girard | 296/36 |
| 5,393,114 | 2/1995 | Christensen | 296/36 |
| 5,454,612 | 10/1995 | Christensen | 296/3 |
| 5,470,120 | 11/1995 | Christensen | 296/3 |
| 5,513,890 | 5/1996 | Christensen | 296/3 |
| 5,584,521 | 12/1996 | Hathaway et al. | 296/36 |
| 5,655,808 | 8/1997 | Wheatley | 296/100.17 |

*Primary Examiner*—D. Glenn Dayoan
*Assistant Examiner*—Patricia Engle
*Attorney, Agent, or Firm*—Wall Marjama Bilinski & Burr

[57] ABSTRACT

A mounting fixture for a pickup truck that has a bed that includes a front wall, a rear tail gate and a pair of side walls that diverge at a given angle from the tail gate toward the front wall. The fixture includes a pair of support units mounted upon each bed side wall that extends along the length of the bed. Each unit further includes a horizontal flat platform that is attached to an associated side wall and a side rail that extends downwardly from the platform into the bed. The side rails converge from the tailgate toward the bed front wall. Parallel guideways are formed in the platforms and side rail for slidably receiving various components therein.

13 Claims, 5 Drawing Sheets

6,116,673

MOUNTING FIXTURE FOR TRUCK BED

BACKGROUND OF THE INVENTION

This invention relates to an apparatus for mounting a variety of accessories upon the bed of a pick up truck.

Most modern day pick up trucks are equipped with beds that taper downwardly from the cab end of the truck toward the tail gate end. This makes the mounting of various components, particularly those that span the sidewalls of the bed difficult. Rail systems have been devised for slidably mounting tool boxes between the side walls of the bed, however, the rails must be specifically fitted to the bed in order to permit the tool box to slide. Typically, the rails are mounted on top of the bed side walls thus making the mounting of other accessories such as bed caps, covers, and racks extremely difficult, if at all possible.

SUMMARY OF THE INVENTION

It is therefore an object of the present invention to improve apparatus for mounting accessories upon the bed of a pickup truck.

It is a further object of the present invention to provide a universal mounting fixture that can be adapted to secure a wide variety of accessories alone, or in combination, upon the bed of a small pickup truck.

It is a still further object of the present invention to provide a universal mounting fixture for a small truck that compensates for the normal taper in the side walls of a pickup truck bed so that accessories can be slidably mounted between the side walls of the bed without impeding the ability to mount further accessories upon the fixture.

Another object of the present invention is to provide a mounting fixture for the bed of a pickup truck that has a twin slide system that can be easily and quickly adapted to accept a wide variety of truck accessories.

Yet another object of the present invention is to provide a universal mounting fixture having a slide system for the bed of a pickup truck that can be mounted upon the truck bed without the need to modify the bed or the fixture.

These and other objects of the present invention are attained by means of a universal mounting fixture for the bed of a pickup truck that has a front wall and a rear tail gate and a pair of sidewalls that diverge from the tail gate toward the front wall of the bed. The fixture includes two mounting units that are attached to the side walls of the bed. Each unit extends along the length of the bed and includes a flat horizontally disposed platform that overlies the top of an associated side wall and a vertically disposed side rail that depends downwardly from the platform into the bed. The two side rails converged from the tail gate of the bed toward the front wall at an angle that is equal to the angle of divergence of the bed side walls so that the side rails are in parallel alignment along the length of the bed. Parallel elongated guideways are formed along the length of the platforms and the side rails. The side rail guideways open into the truck bed while the platform guideways open upwardly through the top of each platform. Brackets of different configurations can be slidably positioned within the guideways for attaching accessories upon the bed of the truck.

BRIEF DESCRIPTION OF THE DRAWING

For a better understanding of these and other objects of the invention, reference will be made herein to the following detailed description of the invention that is to be read in connection with the accompanying drawings, in which.

DETAILED DESCRIPTION OF THE INVENTION

Figure 1:
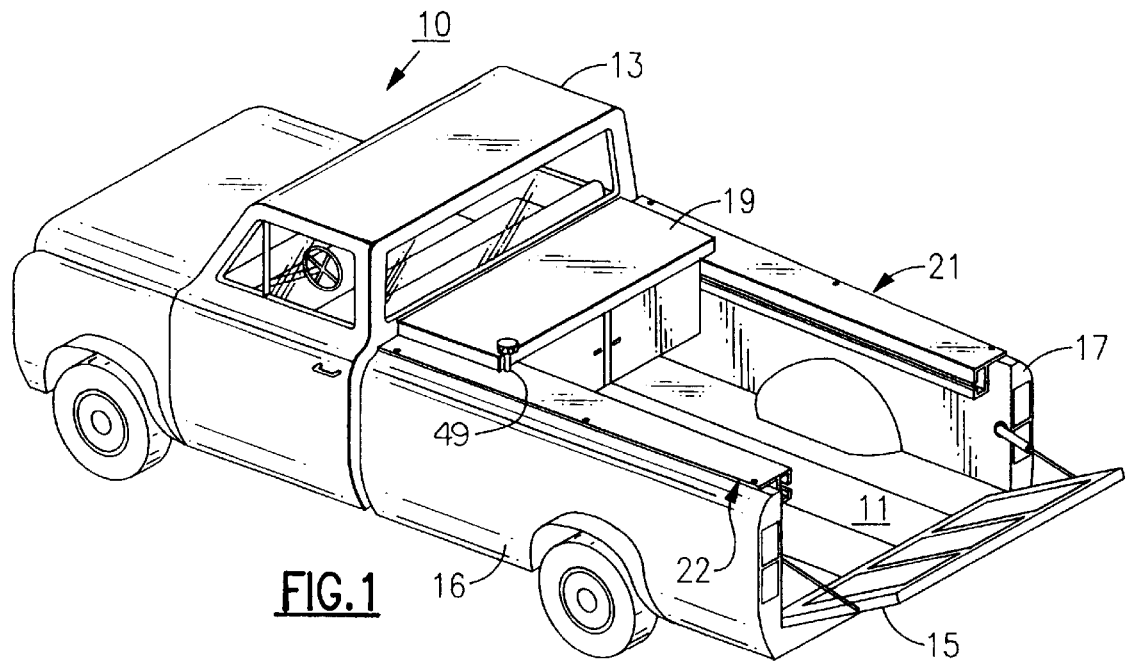
FIG. 1 is a perspective view of a pickup truck having the basic mounting fixture of the present invention located upon the side walls of the truck bed and a tool chest slidably mounted in the fixture adjacent to the truck cab.
Figure 2:
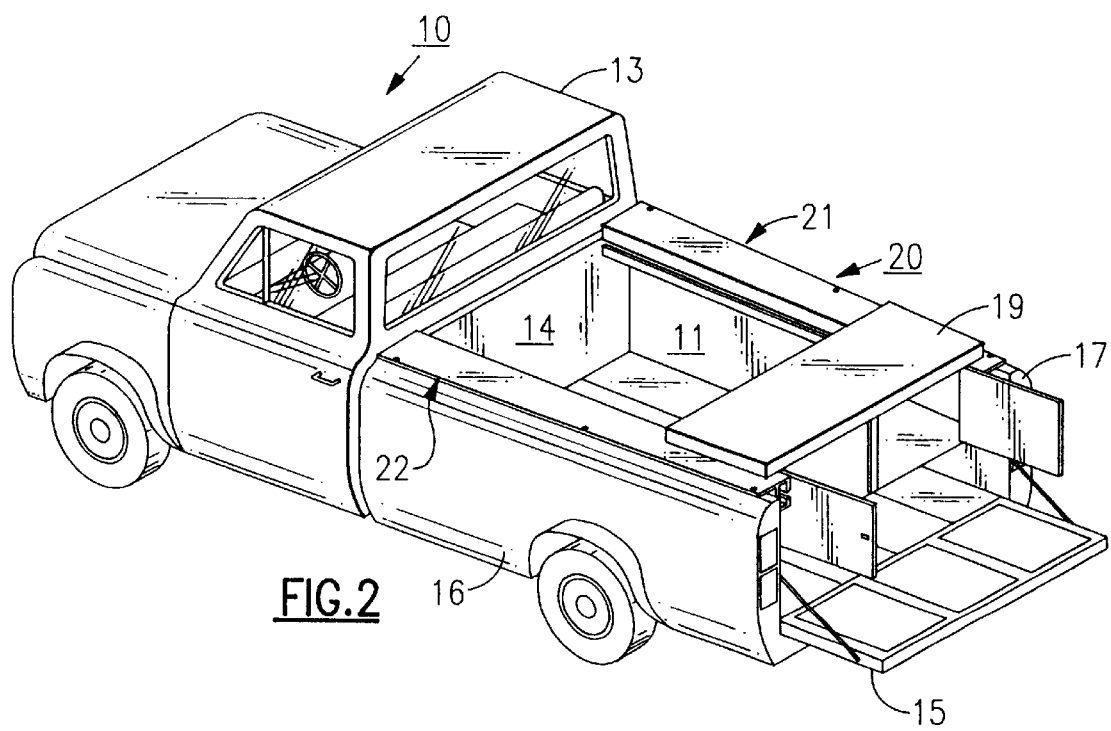
FIG. 2 is a view similar to FIG. 1 showing the tool chest moved along the fixture to a position adjacent to the tail gate of the truck bed.
Figure 3:
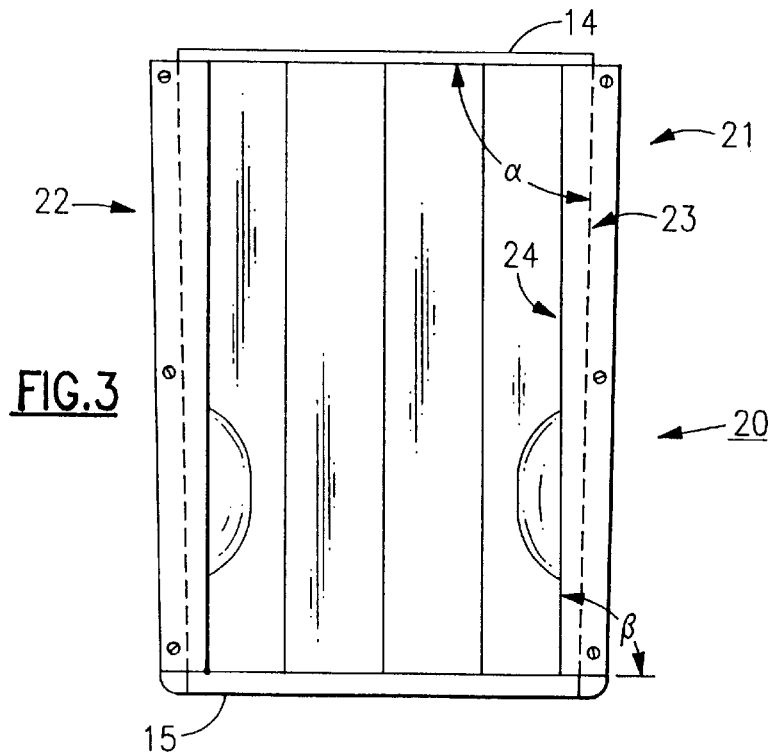
FIG. 3 is a partial top plan view of a truck bed further illustrating the fixture of the present invention.
Figure 4:
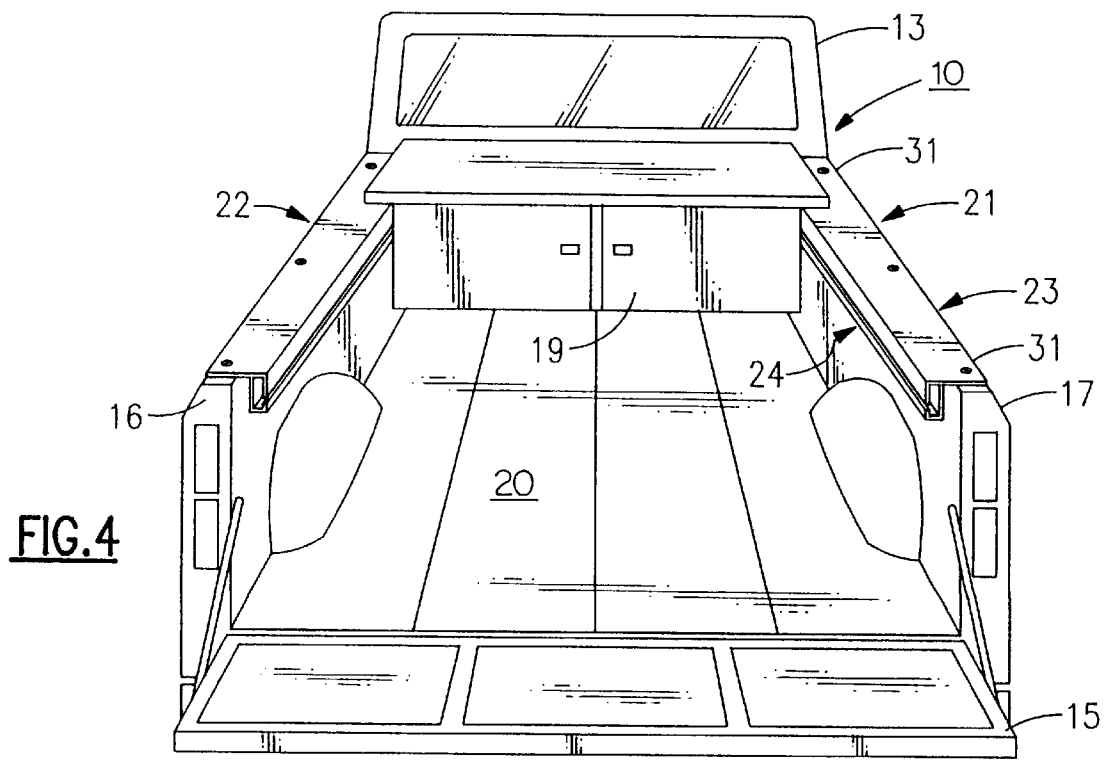
FIG. 4 is an enlarged rear perspective view illustrating in further detail the mounting fixture of the present invention.

Referring initially to FIGS. 1–4, there is shown a standard type pickup truck, generally referenced 10, having a conventional bed 11 mounted upon the truck chassis behind the truck cab 13. As illustrated in FIGS. 3 and 4, the bed includes a front wall 14 and a rear tail gate 15 and a pair of side walls 16 and 17. The bed side walls of a typical modern day pickup trucks diverge at a given angle α from the tail gate toward the front wall of the bed. Accordingly, a component such as tool chest 19, supported between the side walls of the bed is generally relatively difficult to mount and takes considerable modification of the supporting structure to slidably support the component so that it can move freely between the front and the back of the truck bed.

The present truck bed is equipped with a mounting fixture generally referenced 20 that embodies the present invention. The fixture includes a pair of mounting units 21 and 22 that are secured to the opposed side walls of the truck bed. Each unit further includes a horizontally disposed flat platform 23 and a dependent vertically disposed side rail 24 that extends downwardly from the platform inside the bed. As best illustrated in FIG. 3, the side rails of the fixture, in assembly, are offset with regard to the associated platform so that the side rails, when mounted upon the side walls of the truck bed converge from the tail gate toward the front wall of the bed at the angle β that is equal to the angle of divergence of the bed side walls.

Figure 5:
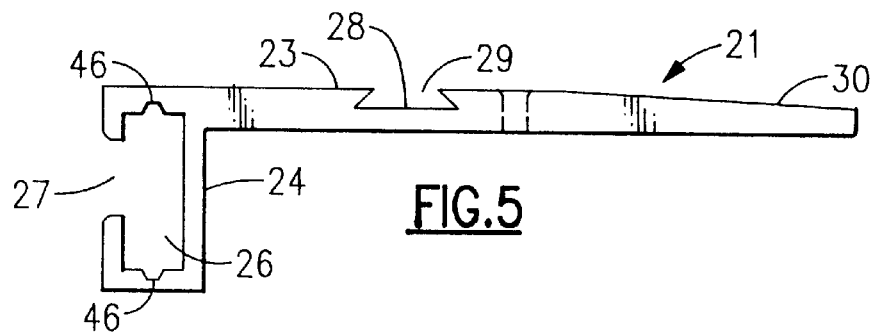
FIG. 5 is a side view showing the basic configuration of one of the side units of the present mounting fixture.

As best illustrated in FIG. 5, the side rails of each mounting unit is provided with a guideway 26 in the form of a T-slot that extends along the entire length of the rail. Each T-slot has a horizontally disposed opening 27 that passes outwardly into the truck bed. The platform of each unit is similarly provided with a second guideway 28 that is dovetail shaped and has an opening 29 that passes upwardly through the top surface of the platform. The dovetail guideways 28 provided in the opposed mounting units are parallelly aligned in assembly as are the guideways 26 provided in the side rails. Accordingly, components that are slidably mounted in either or both sets of guideways can be positioned anywhere along the parallel paths of travel described by the guideways between the units without binding. This, in turn, permits any number of parts to be suspended between the mounting units and located at an infinite number of positions along the length of the bed.

Figure 6:
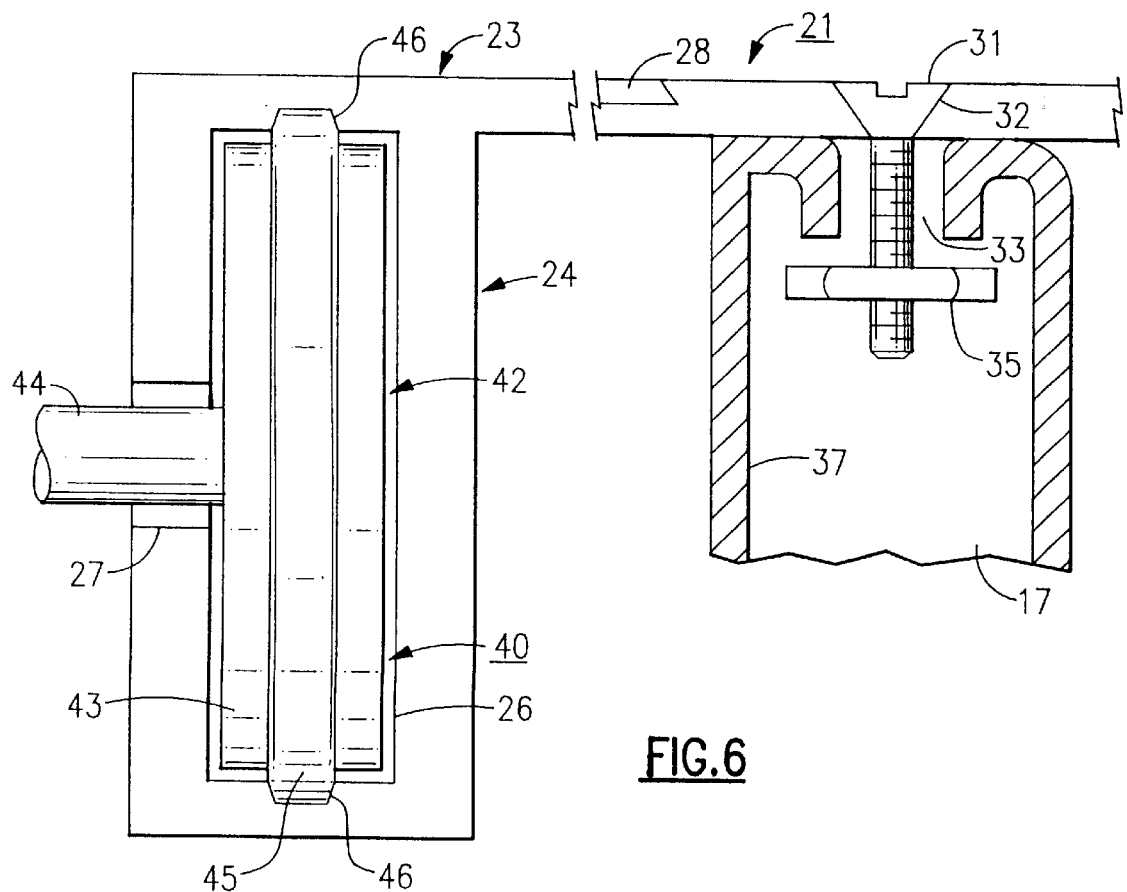
FIG. 6 is an enlarged end view of one of the mounting units further illustrating the platform of the unit secured to the truck bed.

Referring specifically to FIG. 6, each mounting unit 21 is affixed to an associated bed side wall 17 by means of a series of threaded fasteners 31. The fasteners are flat headed bolts that are received in counter-sunk holes formed in each platform of each unit. The shank of each bolt is adapted to pass downwardly into a hole 33 that is normally provided along the top of each sidewall. Each bolt is equipped with a nut 35 that is elongated in one direction so that the nut, when threaded into the end of a companion bolt, can be inserted at any angle into an underlying hole 33. The elongated length of the nut is sufficiently long so that the nut is arrested against the inside surface 37 of the bed side wall when the bolt is turned. Further turning of the bolt causes the nut to be drawn tightly against the top surface of the sidewall thus securing the platform to the side wall of the bed. Accordingly, the mounting units are provided a slight amount of adjustment in assembly.

As further illustrated in FIG. 6, a carriage, generally referenced 40, is shown mounted for movement within the guideway formed in the side rail 24 of one of the mounting units 21. The carriage contains one or more roller units 42 that allow the carriage to move smoothly along the rails. Each roller unit includes a disc 43 that is rotatably supported upon shaft 44. A wheel 45 is centrally mounted upon the roller disc and adapted to ride in grooves 46 formed in the top and bottom walls of the guideway. The shaft is arranged to pass out of the guideway opening 27 into the truck bed.

Figure 7:
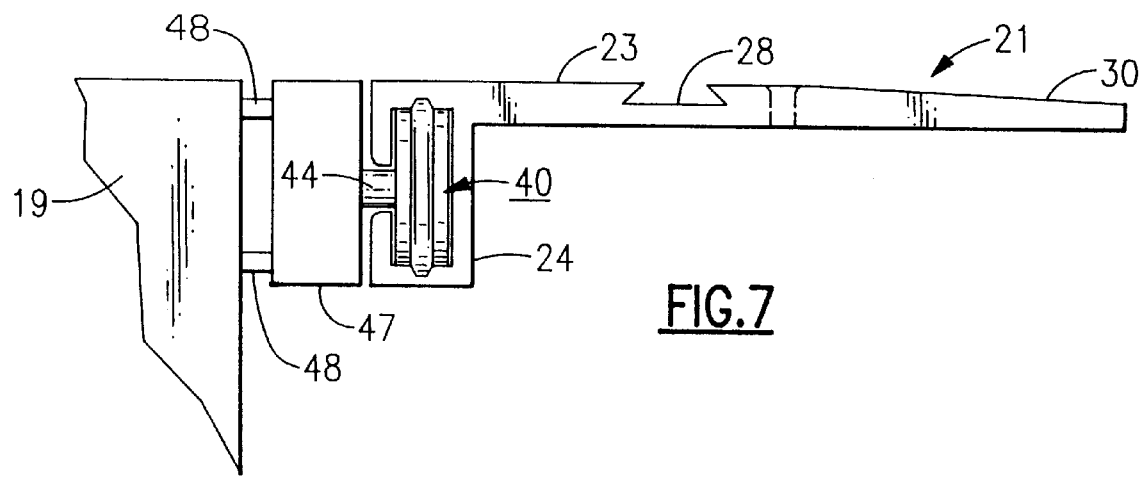
FIG. 7 is a side view of one side unit showing a mounting bracket slidably mounted in the guideway of the unit's side rail.

Turning now to FIG. 7, there is illustrated one of the mounting units 21 containing a carriage 40 as described above that is movably contained in the guideway 26 of rail 24. The carriage shaft 24 is secured to a mounting bracket 47. The bracket, in turn, is secured to a tool chest 19 by any type of suitable connector 48. The tool chest is similarly mounted in the opposite mounting unit 22 so that the chest can be moved along the truck bed to any number of desired positions.

As illustrated in FIG. 1, the chest is normally stored against the back wall 14 of the bed when the truck is moving or the chest is not in use. A stop 49 in the form of a threaded pin or the like, is removably contained in one or both mounting units to hold the chest securely against the back wall of the bed so that the chest cannot roll or shift its position when the truck is moving. Removal or releasing of the stop will permit the chest to be easily moved to the tailgate of the bed as illustrated in FIG. 2 so that the contents of the chest can be easily accessed by a workman standing at the rear of the truck. Although a threaded pin is described with reference to this embodiment of the invention, any suitable stop mechanism may be similarly employed by the practice of the present invention without departing from the spirit of the invention.

Figure 11:
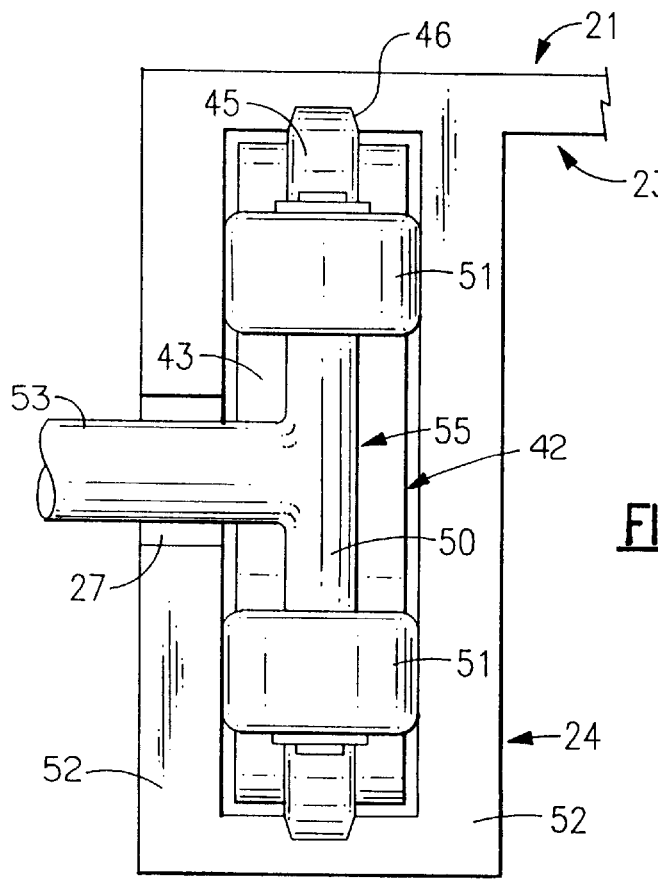
FIG. 11 is a partial side view of one of the mounting fixture units further illustrating a mounting bracket slidably mounted in the guideway of the unit side rail which is equipped with side loading rollers.

FIG. 11 illustrates a carriage arrangement 55 that can be used where the carriage experiences heavy side loading. Here, the carriage is equipped with a vertical shaft 50 that rotatably supports a pair of rollers 51 that rides in rolling contact against the vertical walls 52—52 of the guideway 26. The shaft is coupled to a support bar 53 that is affixed to a load support or the like. Although not shown, the carriage may be equipped with any combination of rollers rotating about vertically or horizontally disposed shafts. As illustrated in FIG. 11, the carriage is equipped with a roller assembly 42 as disclosed above which keeps the carriage centered in the guideway.

Figure 8:
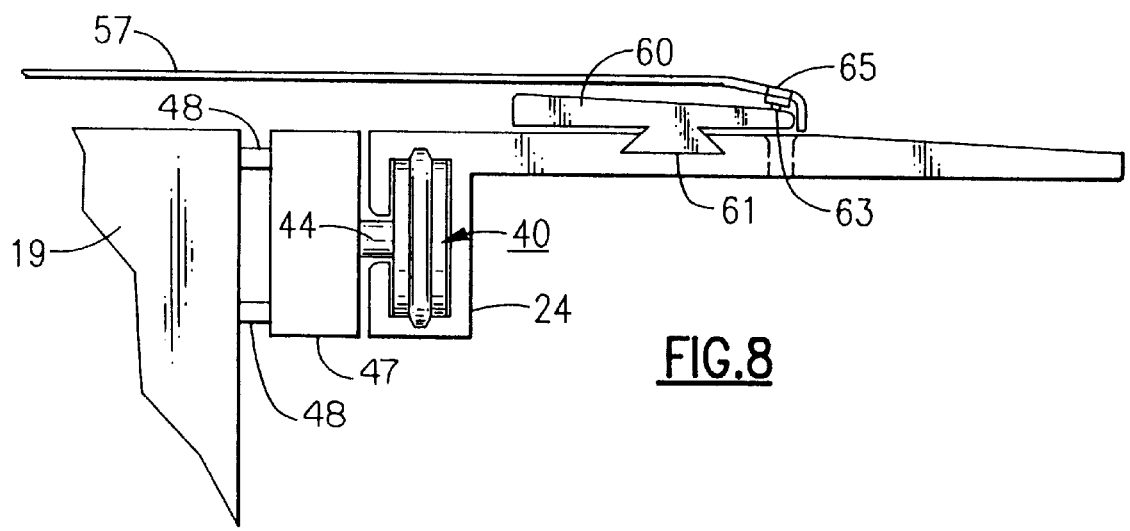
FIG. 8 is a side view similar to FIG. 7 further showing a tonneau cover attached to the horizontal platform of the unit.

FIG. 8 illustrates a further embodiment of the invention wherein the truck bed is equipped with a tonneau cover 57 to protect articles stored in the bed from the elements. An elongated beam 60 having a length that is approximately equal to the length of one of the mounting units is provided with a male dovetail 61 that is slidably received in the female dovetail shaped guideway 28 formed in the platform 23 of each mounting unit. The beam is equipped with a series of axially aligned male clips 63 that are adapted to receive female clips 65 attached along the side edges of the cover to hold the cover tightly in place over the bed. The opposed beams raise the cover sufficiently so that components, such as tool chest 19, supported between the side rails 24 can be stored beneath the cover.

Figure 9:
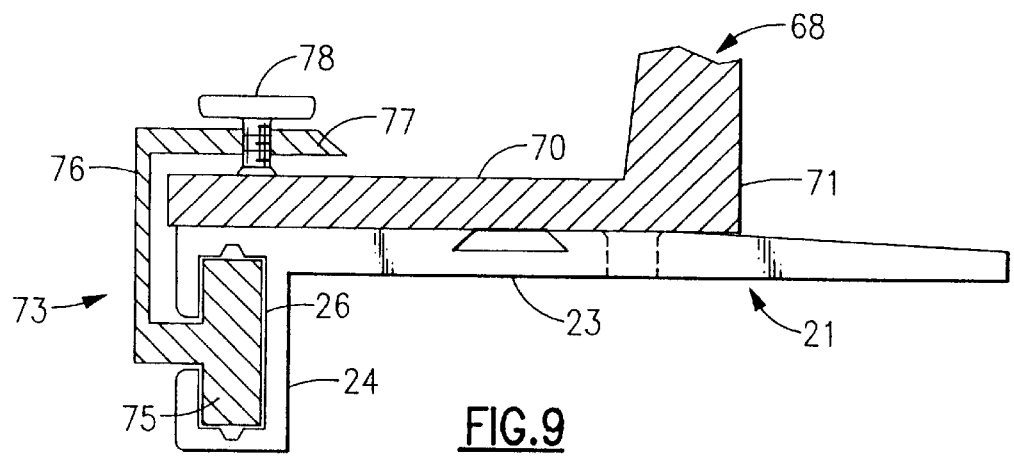
FIG. 9 is a side view of one of the mounting units showing a truck cap mounted upon the horizontal platform of the unit.

A further embodiment of the present invention is illustrated in FIG. 9 wherein the mounting fixture is adapted to support a truck cap 68 over the truck bed. The truck cap is of conventional design having a horizontal flange 70 that extends inwardly from the cap walls 71 and which normally rests on top of the side walls of the truck bed. In this embodiment of the invention, the cap flange is supported as shown upon the opposed platforms of the two mounting units. A series of clamps 73 that are slidably mounted in the guideways 26 provided in each side rail 24. Each clamp includes a slide member 75 that rides within the guideway 26 and a channel-shaped section 76 that is connected to the slide member. The top arm 77 of the channel shaped section extends back over the cap flange and is equipped with a thumb screw 78 that can be tightened down to secure the flange and thus the cap to the truck bed against the two platforms associated with the mounting fixture.

Figure 10:
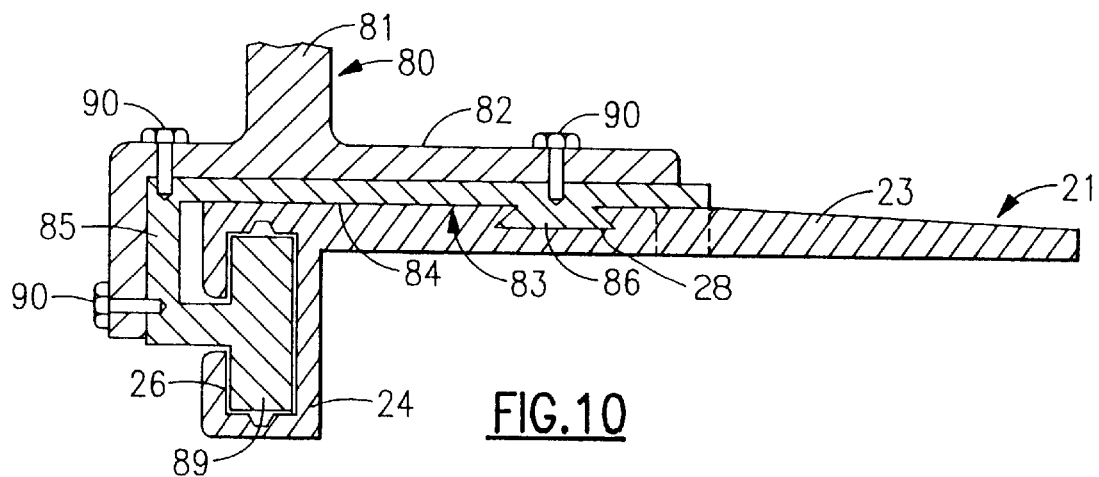
FIG. 10 is a view similar to FIG. 9 showing a rack for supporting ladders or the like mounted upon one of the mounting units.

Turning now to FIG. 10, there is illustrated a rack system 80 for supporting such articles as ladders, lumber, boats and the like above the truck bed. The rack system includes a series of risers 81 that are connected to an L-shaped base 82. Although not shown, the risers are interconnected by cross members to complete the rack system. A support member 83 is mounted in each mounting unit 21 beneath the rack base. The support member includes a horizontal arm 84 and a vertical arm 85 that complement the inside contour of the L-shaped base 82 so that the base can be snugly mounted upon the support member as illustrated. The horizontal arm of the support member contains a male dovetail 86 that is slidably received in guideway 28 of the associated platform 23. The vertical arm of the slide contains a rectangular shaped lug 89 that is slidably contained within the guideway 26 of the adjacent side rail 24. The base of the riser is secured to the support member by bolts 90 that are threaded into the support member as shown. As should be evident from the disclosure above, a rack equipped with slides can be easily mounted in the guideways and moved to a desired position. Here again, a stop mechanism can be employed to keep the rack from moving once it is mounted at a desired location upon the truck bed.

While this invention has been explained with reference to the structure disclosed herein, it is not confined to the details set forth and this invention is intended to cover any modifications and changes as may come within the scope of the following claims.

What is claimed is:

1. A mounting fixture for a pickup truck that includes a truck bed having a front wall, a tail gate and a pair of side walls that diverge from the tail gate toward said front wall at a given angle, comprising:

an L-shaped unit mounted upon each side wall of the bed that extends along the length of the side wall, each unit further including a horizontally disposed flat platform that is attached to an associated bed side wall and a vertically disposed side rail that extends downwardly from the platform into said bed, said side rails converging from the tail gate toward the front wall of the bed at an angle equal to the angle of divergence of the bed sidewalls whereby the side rails on the units are in parallel alignment, and each side rail containing a guideway that extends along the length of the rail and having a side opening that passes out into the bed, said guideways being in parallel alignment whereby a component suspended between said guideways can slide freely along the length of the bed.

2. The fixture of claim 1 wherein each unit platform contains a second guideway that extends along the length of the platform and having an opening that passes through the top of said platform, said platform guideways being in parallel alignment.

3. The fixture of claim 2 wherein said guideways in said side rails are T-slots.

4. The fixture of claim 3 wherein said guideways in said platforms are dovetail shaped slots.

5. The fixture of claim 4 that further includes carriage means mounted in said side rail guideways.

6. The fixture of claim 4 that further includes a tool chest suspended between said brackets.

7. The fixture of claim 5 wherein said carriage means further includes a plurality of brackets that are mounted upon rollers contained within said side rail guideways.

8. The fixture of claim 7 wherein said carriage contains rollers that are adapted to ride in contact against opposed horizontal walls of the side rail guideways.

9. The fixture of claim 8 wherein said carriage further includes rollers that are arranged to ride in contact against opposed vertical walls of the side rail guideways.

10. The fixture of claim 5 that further includes an elongated member having a male dovetail that is slidably received in each platform guideway, each member further containing connector means for attaching a tonneau cover over the tuck bed.

11. The fixture of claim 4 wherein each unit further includes at least one L-shaped bracket having a top leg containing a male dovetail that is slidably contained within the platform guideway and a side leg having a male slide slidably contained within said side rail guideway.

12. The fixture of claim 11 that further includes a raised rack mounted upon said L-shaped brackets so that said rack spans across said truck bed.

13. The fixture of claim 4 that further includes a truck cap having a horizontally disposed base flange that rests upon the platforms of the two fixture units and a series of clamping means slidably contained in each side rail guideway, each clamp further including a horizontal arm that extends over the base flange of the cap and a threaded fastener mounted in said arm for clamping the cap base flange against the underlying platform.

* * * * *

UNITED STATES PATENT AND TRADEMARK OFFICE
CERTIFICATE OF CORRECTION

PATENT NO. : 6,116,673
DATED : September 12, 2000
INVENTOR(S) : Richard S. Clonan It is certified that error appears in the above-identified patent and that said Letters Patent is hereby corrected as shown below:

Column 1, line 6, delete modem and insert --modern--.
Column 6, line 16, delete tuck and insert --truck--.

Signed and Sealed this

Twenty-second Day of May, 2001

*Attest:*

NICHOLAS P. GODICI

*Attesting Officer*     Acting Director of the United States Patent and Trademark Office